United States Patent
Whittle et al.

(10) Patent No.: US 10,883,376 B2
(45) Date of Patent: Jan. 5, 2021

(54) TURBINE VANE ASSEMBLY WITH CERAMIC MATRIX COMPOSITE VANES

(71) Applicant: Rolls-Royce plc, London (GB)

(72) Inventors: Michael J. Whittle, London (GB); Steven Hillier, London (GB)

(73) Assignee: Rolls-Royce plc

( * ) Notice: Subject to any disclaimer, the term of this patent is extended or adjusted under 35 U.S.C. 154(b) by 191 days.

(21) Appl. No.: 16/265,565

(22) Filed: Feb. 1, 2019

(65) Prior Publication Data
US 2020/0248573 A1 Aug. 6, 2020

(51) Int. Cl.
| | | |
|---|---|---|
| F01D 9/04 | (2006.01) | |
| F01D 11/00 | (2006.01) | |
| F01D 5/12 | (2006.01) | |
| F01D 5/28 | (2006.01) | |

(52) U.S. Cl.
CPC .............. F01D 11/001 (2013.01); F01D 5/12 (2013.01); F01D 5/284 (2013.01); F05D 2220/32 (2013.01); F05D 2240/55 (2013.01); F05D 2300/20 (2013.01)

(58) Field of Classification Search
CPC . F01D 5/12; F01D 5/282; F01D 5/284; F01D 9/041; F01D 11/001; F05D 2220/32; F05D 2240/55; F05D 2300/20; F05D 2300/2261; F05D 2300/6033
See application file for complete search history.

(56) References Cited

U.S. PATENT DOCUMENTS

| | | | |
|---|---|---|---|
| 4,396,349 A * | 8/1983 | Hueber | F01D 5/284 415/115 |
| 5,591,003 A * | 1/1997 | Boyd | F01D 9/042 415/209.2 |
| 5,740,674 A | 4/1998 | Beutin et al. | |
| 5,931,636 A | 8/1999 | Savage et al. | |
| 6,325,593 B1 | 12/2001 | Darkins, Jr. et al. | |
| 6,514,046 B1 | 2/2003 | Morrison et al. | |
| 6,558,114 B1 | 5/2003 | Tapley et al. | |
| 6,648,597 B1 | 11/2003 | Widrig et al. | |
| 7,008,185 B2 * | 3/2006 | Peterman | F01D 5/189 416/96 A |
| 7,762,766 B2 | 7/2010 | Shteyman et al. | |
| 8,007,229 B2 | 8/2011 | McCaffrey et al. | |
| 8,133,011 B2 | 3/2012 | Cortequisse | |
| 8,454,303 B2 | 6/2013 | Garcia-Crespo | |
| 8,454,304 B2 | 6/2013 | Heriz Agiriano et al. | |
| 9,097,141 B2 | 8/2015 | Paradis | |
| 9,546,557 B2 | 1/2017 | Grooms, III et al. | |
| 9,810,082 B2 * | 11/2017 | Calza | F01D 9/04 |
| 9,915,159 B2 | 3/2018 | Huizenga et al. | |
| 9,995,160 B2 * | 6/2018 | Sarawate | F01D 25/162 |
| 10,174,627 B2 | 1/2019 | Chang et al. | |
| 2010/0068034 A1* | 3/2010 | Schiavo | F01D 5/282 415/115 |
| 2014/0001285 A1 | 1/2014 | Grooms, III et al. | |
| 2014/0255174 A1 | 9/2014 | Duelm et al. | |

(Continued)

Primary Examiner — Igor Kershteyn
(74) Attorney, Agent, or Firm — Barnes & Thornburg LLP

(57) ABSTRACT

A turbine section adapted for use in a gas turbine engine includes a turbine case, a turbine wheel, and a turbine vane assembly. The turbine case is made from metallic materials. The turbine wheel is housed in the case. The turbine vane assembly is fixed to the case and configured to smooth and redirect air moving along a primary gas path of the turbine section.

20 Claims, 3 Drawing Sheets

(56) References Cited

U.S. PATENT DOCUMENTS

| | | |
|---|---|---|
| 2015/0093249 A1* | 4/2015 | Lang .................. F01D 5/14 |
| | | 416/241 B |
| 2016/0003072 A1 | 1/2016 | Chang et al. |
| 2016/0084096 A1* | 3/2016 | Carr .................... F02C 3/04 |
| | | 60/805 |
| 2016/0130960 A1 | 5/2016 | Cortequisse |
| 2016/0146040 A1 | 5/2016 | Simpson et al. |
| 2016/0177761 A1 | 6/2016 | Huizenga et al. |
| 2016/0201488 A1 | 7/2016 | Carr et al. |
| 2017/0022833 A1 | 1/2017 | Heitman et al. |
| 2017/0051619 A1 | 2/2017 | Tuertscher |
| 2018/0045117 A1 | 2/2018 | Groves, II et al. |
| 2018/0223680 A1 | 8/2018 | Hafner |
| 2018/0238183 A1* | 8/2018 | Reynolds ............... F23R 3/10 |
| 2018/0328187 A1 | 11/2018 | Oke |
| 2018/0340431 A1 | 11/2018 | Kerns et al. |
| 2018/0370158 A1 | 12/2018 | Gather et al. |

\* cited by examiner

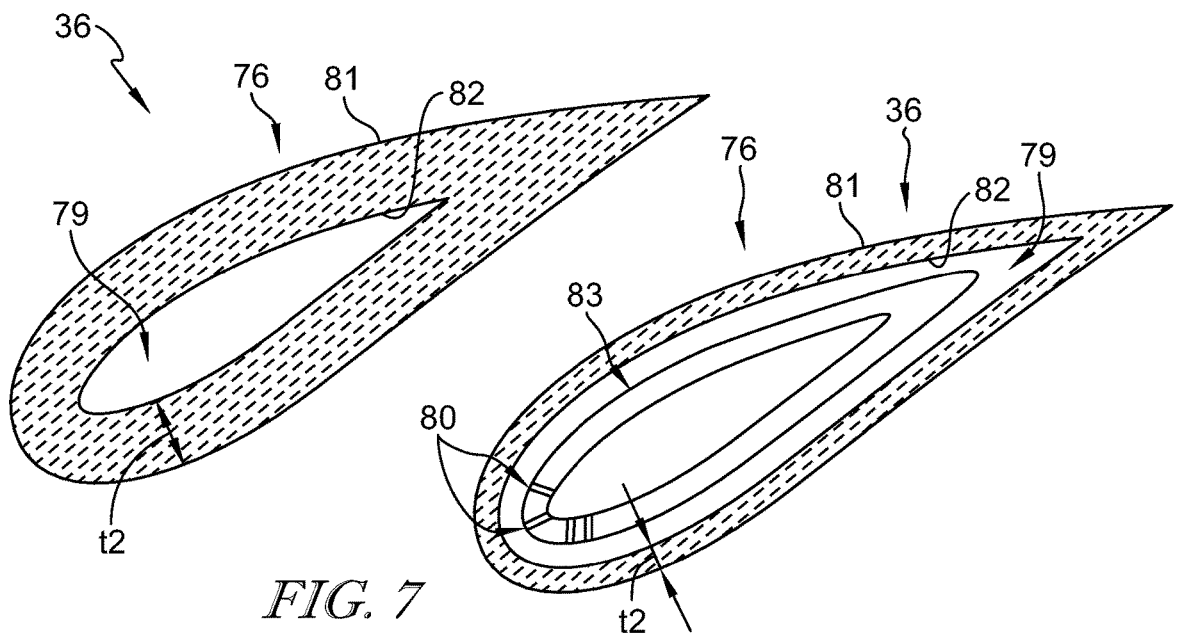
FIG. 7
FIG. 7A
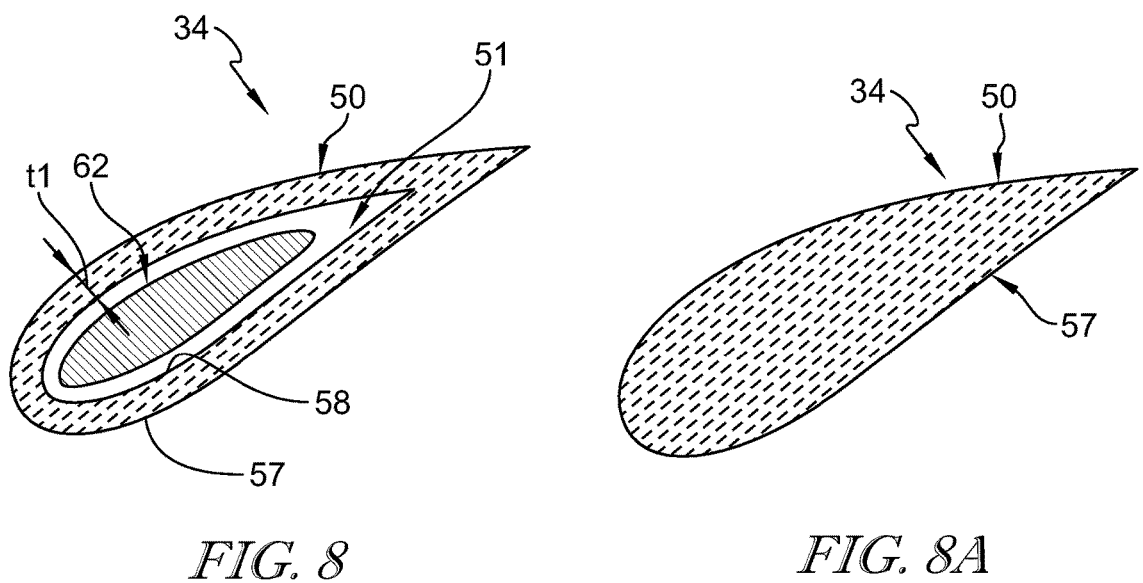
FIG. 8
FIG. 8A

TURBINE VANE ASSEMBLY WITH CERAMIC MATRIX COMPOSITE VANES

FIELD OF THE DISCLOSURE

The present disclosure relates generally to vane assemblies for gas turbine engines, and more specifically to vanes that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine section adapted for use in a gas turbine engine may include a case made from metallic materials, a turbine wheel, and a turbine vane assembly. The case may be shaped to extend around a central reference axis. The turbine wheel may be housed in the case. The turbine vane assembly may be fixed to the case and may be configured to smooth and redirect air moving along a primary gas path of the turbine section ahead of interaction with the turbine wheel.

In some embodiments, the turbine wheel may include a disk, a plurality of blades, and a rotatable seal element. The disk may be mounted for rotation about the central reference axis relative to the case. The plurality of blades may be coupled to the disk for rotation with the disk. The rotatable seal element may be coupled to the disk for rotation with the disk.

In some embodiments, the turbine vane assembly may include a plurality of composite aero vanes made of ceramic matrix composite materials, a plurality of structural vanes, and a static seal element. The plurality of composite aero vanes may be shaped to provide inner and outer end walls defining the primary gas path as well as airfoils that extend across the primary gas path. The plurality of structural vanes may be shaped to provide airfoils that extend across the primary gas path. The static seal element may cooperate with the rotatable seal element of the turbine wheel to provide a seal for resisting movement of gasses across the seal when the turbine section is in use within a gas turbine engine.

In some embodiments, the airfoils of the composite aero vanes may each have a first outer surface area facing the primary gas path. In some embodiments, the airfoils of the structural vanes may each have a second outer surface area facing the primary gas path that is greater than the first outer surface area.

In some embodiments, the static seal element may be fixed to the plurality of structural vanes so as to be in turn coupled to the case while remaining free for relative movement in relation to the composite aero vanes. Accordingly, the composite aero vanes may be substantially free from carrying mechanical loads applied by pressure on the static seal element to the case. In some embodiments, the seal provided by the rotatable seal element and the static seal element may be arranged radially inward of the primary gas path.

In some embodiments, the static seal element may include a seal panel and at least one seal land. The seal panel may divide axially adjacent compartments within the turbine section. The at least one seal land may be engaged by the rotatable seal element.

In some embodiments, the rotatable seal element may include a knife ring. The knife ring may engage the land of the static seal element.

In some embodiments, the plurality of structural vanes may each include an inner end wall and an outer end wall. The inner end wall may face the primary gas path, The outer end wall may be spaced radially from the inner end wall and may face the primary gas path. In some embodiments, the airfoil may be formed integrally with the inner end wall and the outer end wall.

In some embodiments, the plurality of structural vanes may be made of ceramic matrix composite materials. In some embodiments, the plurality of structural vanes may be made of metallic materials.

In some embodiments, the plurality of structural vanes may each include a seal mount. The seal mount may extend radially inwardly from the inner end wall away from the primary gas path. The static seal element may be fixed to the seal mount.

In some embodiments, the plurality of structural vanes may each include a case mount. The case mount may extend radially outwardly from the outer end wall away from the primary gas path. The case mount may engage the case to couple the structural vane and the static seal element to the case. In some embodiments, each of the plurality of composite aero vanes may be spaced apart from the static seal element.

According to an aspect of the present disclosure, a turbine vane assembly adapted for use in a gas turbine engine may include a plurality of composite aero vanes made from ceramic matrix composite material, a plurality of structural vanes, and a static seal element. The static seal element may be fixed to the plurality of structural vanes and may be spaced apart from the composite aero vanes.

In some embodiments, each of the plurality of composite aero vanes may include an inner end wall, an outer end wall, and an airfoil. The inner end wall may extend partway around a central reference axis. The outer end wall may be spaced radially from the inner end wall to define a primary gas path therebetween. The airfoil may extend from the inner end wall to the outer end wall across the primary gas path.

In some embodiments, each of the plurality of structural vanes may include airfoils. The airfoils may extend across the primary gas path.

In some embodiments, the airfoils of the composite aero vanes may each have a first outer surface area facing the primary gas path. In some embodiments, the airfoils of the structural vanes may each have a second outer surface area facing the primary gas path that is greater than the first outer surface area.

In some embodiments, the plurality of structural vanes may be made of ceramic matrix composite materials. In some embodiments, the plurality of structural vanes may be made of metallic materials.

In some embodiments, the plurality of structural vanes may each include a seal mount. The seal mount may extend radially inwardly from the inner end wall away from the primary gas path. The static seal element may be fixed to the seal mount.

In some embodiments, the plurality of structural vanes may each include a case mount. The case mount may extend radially outwardly from the outer end wall away from the primary gas path. The case mount may be configured to engage a case so that the static seal element may be fixed to the case via the plurality of structural vanes.

In some embodiments, the plurality of structural vanes may each further include an inner end wall and an outer end wall. The inner end wall may face the primary gas path. The outer end wall may be spaced radially from the inner end wall and may face the primary gas path. In some embodiments, the airfoil may be integrally formed with the inner end wall and the outer end wall.

In some embodiments, the plurality of structural vanes may be made of ceramic matrix composite materials. In some embodiments, the plurality of structural vanes may be made of metallic materials.

In some embodiments, each of the plurality of composite aero vanes may be spaced apart from the static seal element. In some embodiments, the plurality of composite aero vanes may be each mounted to a metallic spar that extends radially through the associated airfoil.

These and other features of the present disclosure will become more apparent from the following description of the illustrative embodiments.

BRIEF DESCRIPTION OF THE DRAWINGS

FIG. 7 is a cross-sectional view of another embodiment of the structural vane for use in the turbine vane assembly of FIG. 2;

FIG. 7A is a cross-sectional view of another embodiment of the structural vane for use in the turbine vane assembly of FIG. 2 showing that the structural vane may include a spar extending through the structural vane;

FIG. 8 is a cross-sectional view of another embodiment of the composite aero vane for use in the turbine vane assembly of FIG. 2; and FIG. 8A is a cross-sectional view of another embodiment of the composite aero vane for use in the turbine vane assembly of FIG. 2 showing that the composite aero vane may be a solid component.

DETAILED DESCRIPTION OF THE DRAWINGS

Figure 1:
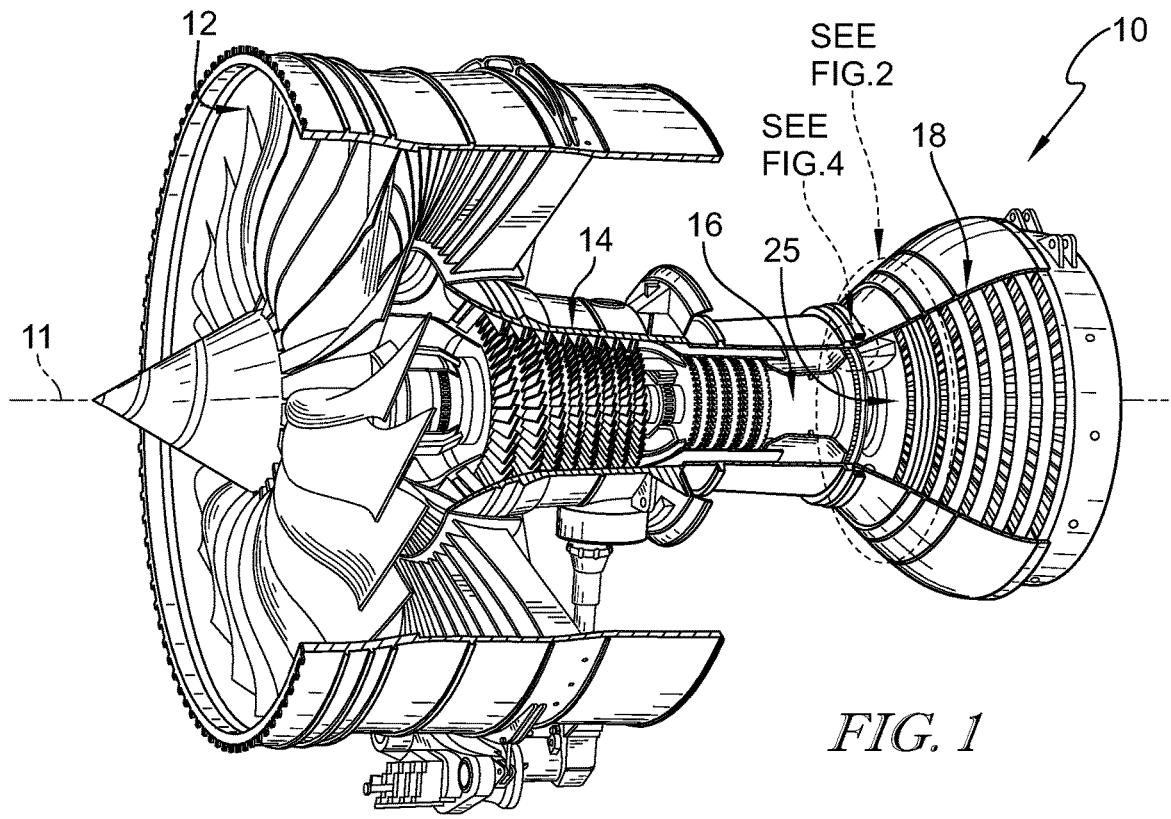
FIG. 1 is a cutaway of a gas turbine engine that includes a fan, a compressor, a combustor, and a turbine that includes a plurality of turbine wheel assemblies and turbine vane assemblies, the turbine vane assemblies being shown in further detail in FIGS. 2-6.

For the purposes of promoting an understanding of the principles of the disclosure, reference will now be made to a number of illustrative embodiments illustrated in the drawings and specific language will be used to describe the same.

Figure 2:
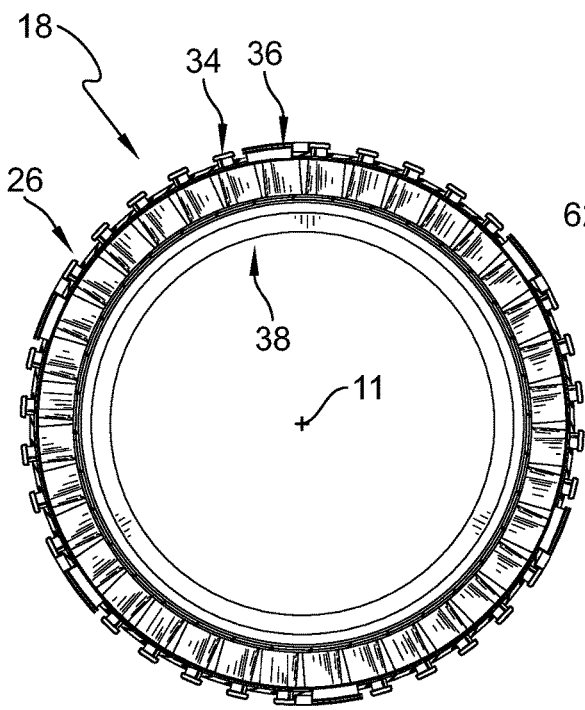
FIG. 2 is a front elevation view of one turbine vane assembly included in the gas turbine engine of FIG. 1 showing that the turbine vane assembly includes a plurality of composite aero vanes, a plurality of structural vanes which are larger in size than the composite aero vanes, and a static seal element mounted radially inward of the ceramic and structural vanes.

A turbine section 18 according to the present disclosure is adapted for use in a gas turbine engine 10 as suggested in FIGS. 1 and 2. The gas turbine engine 10 includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

Figure 3:
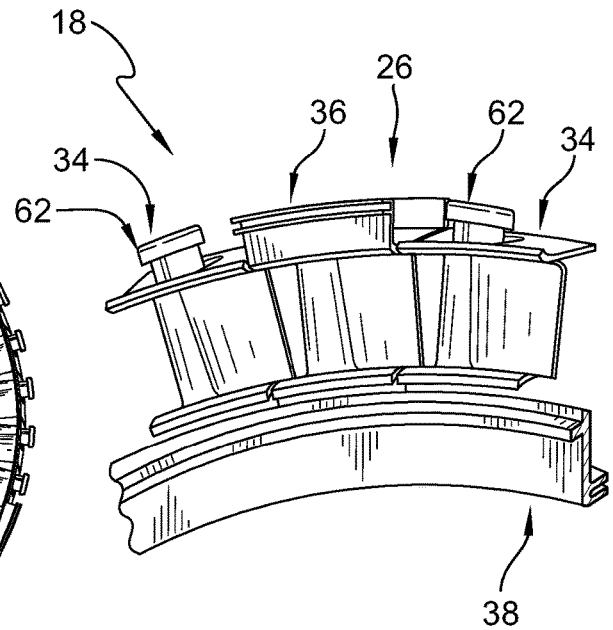
FIG. 3 is a front elevation view of a portion of the turbine vane assembly shown in FIG. 2 illustrating that the structural vanes are interspersed between and separate from the composite aero vanes.

The turbine section 18 includes a turbine case 20, turbine wheels 22, 24, and a turbine vane assembly 26 as shown in FIGS. 1-3. The turbine case 20 is made from metallic materials and shaped to extend around the central reference axis 11. The turbine case 20 surrounds the other components of the turbine section 18. The turbine wheels 22, 24 are housed in the case 20. The turbine vane assembly 26 is fixed to the case 20 and configured to smooth and redirect air moving along a primary gas path 25 of the turbine section 18 ahead of interaction with the turbine wheel 24 and downstream of turbine wheel 22.

Figure 4:
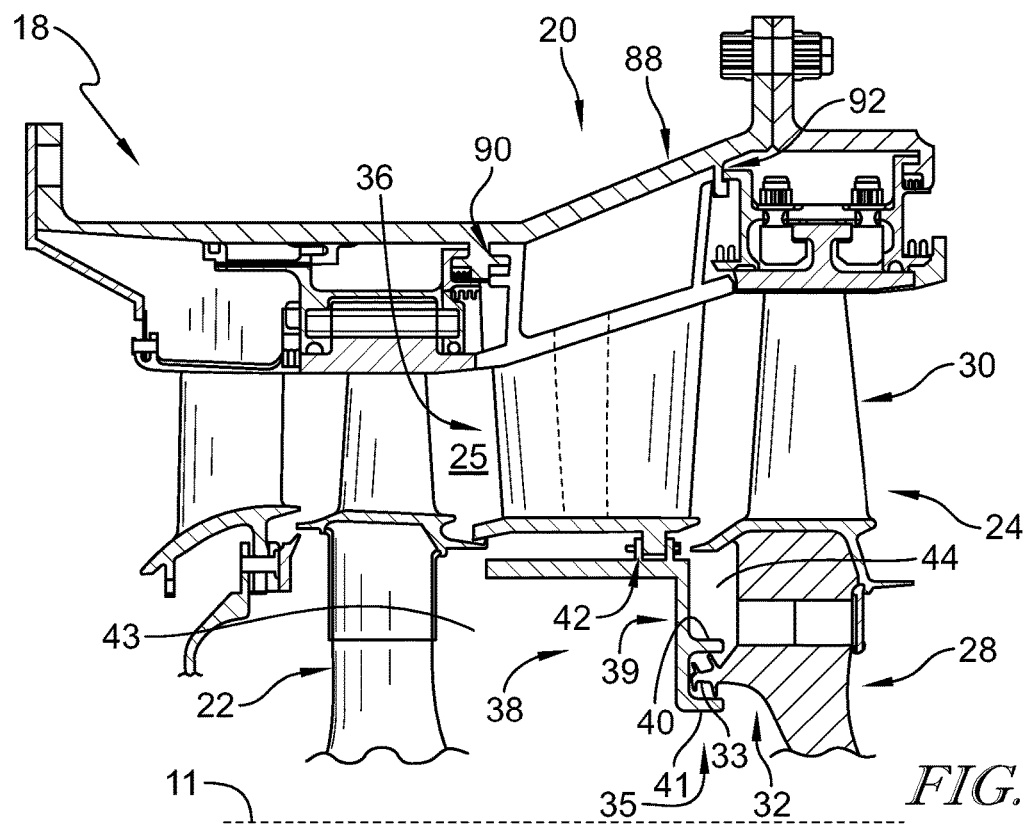
FIG. 4 is a cross-sectional view of a portion of the turbine section of the gas turbine engine of FIG. 1 showing that the turbine vane assembly is mounted between a first stage turbine wheel and a second stage turbine wheel to redirect gas moving from the first stage turbine wheel toward the second stage turbine wheel and showing that the static seal element is fixed to the plurality of structural vanes for engagement with a rotatable seal element of the second stage turbine wheel.

The turbine wheel 24 includes a disk 28, a plurality of blades 30, and a rotating seal element 32 as shown in FIG. 4. The disk 28 is mounted for rotation about the central reference axis 11 relative to the case 20. The plurality of blades 30 are coupled to the disk for rotation with the disk 28. The rotatable seal element 32 is coupled to the disk 28 for rotation with the disk 28.

The turbine vane assembly 26 includes a plurality of composite aero vanes 34, a plurality of structural vanes 36, and a static seal element 38 as shown in FIGS. 2-6. Each of the composite aero vanes 34 comprises ceramic matrix material adapted to withstand high temperatures. However, the composite aero vanes 34 may have relatively low strength compared to the structural vanes 36, which are larger in size than the composite aero vanes 34 (i.e. shape, thickness, volume, etc.). The structural vanes 36 provide structural strength to the turbine vane assembly 26 by receiving the mechanical loads, such as the axial moment applied by pressure on the static seal element 38. The static seal element 38 is fixed to the plurality of structural vanes 36 so as to be in turn coupled to the case 20 while remaining free for relative movement in relation to the composite aero vanes 34. Accordingly, the composite aero vanes 34 are substantially free from carrying mechanical loads applied by pressure on the static seal element 38 to the case 20.

The plurality of composite aero vanes 34 are made from integrally-formed ceramic matrix composite materials as noted above. Each composite aero vane 34 is shaped to provide inner and outer end walls 48, 46 defining the primary gas path 25 and at least one airfoil 50 that extends across the primary gas path 25. The airfoil 50 has an outer surface area 57 that faces the primary gas path 25.

The plurality of structural vanes 36 are made from one of metallic materials and ceramic matrix composite materials. Each structural vane 36 is shaped to provide inner and outer endwalls 74, 72 and at least one airfoil 76 that extend across the primary gas path 25. The airfoil 76 has an outer surface area 81 that is greater than the outer surface area 57 of the airfoil 50 of the composite aero vane 34.

The static seal element 38 cooperates with the rotatable seal element 32 of the turbine wheel 24 to provide a compartment seal 35 for resisting movement of gasses across the compartment seal 35 when the turbine section 18 is in use within a gas turbine engine 10. The compartment seal 35 formed by the static seal element 38 and the rotating seal element 32 seals between axially adjacent compartments 43, 44 resulting in a first pressure in the compartment 43 on the first stage turbine wheel 22 side and a second pressure in the compartment 44 on the second stage turbine wheel 24 side. The first pressure is greater than the second pressure resulting in a difference of pressure on either side 43, 44 of the static seal element 38. The difference of pressure causes a pressure force to act on a seal panel 39 of the static seal component 38. The pressure force results in an axial moment in the turbine vane assembly 26.

In the illustrative embodiment, the static seal element 38 is a single integrally formed ring. In other embodiments, the static seal element 38 may include a plurality of static seal element segments to form the ring shape. The segmented static seal element 38 may also be provided with any other appropriate seal apparatus to seal between each of the segments.

Figure 5:
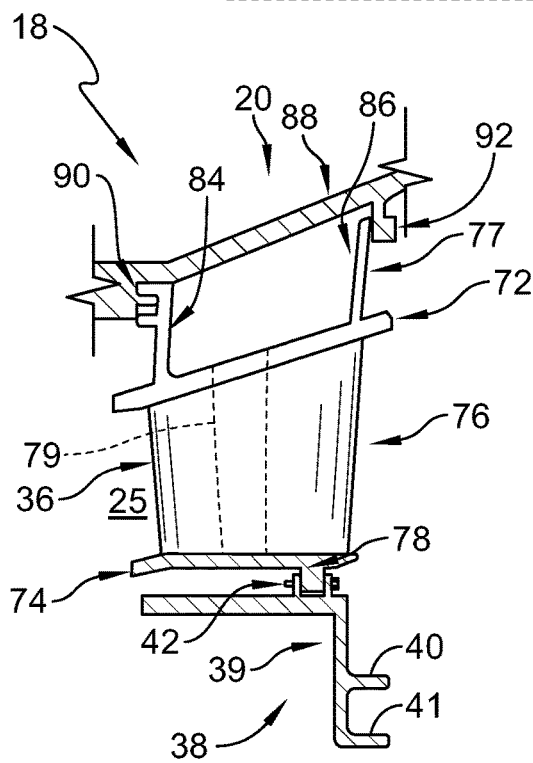
FIG. 5 is a detail view of the turbine section of FIG. 4 showing that structural vanes are coupled directly with the static seal element to transfer axial loading through the structural vanes.

The static seal element 38 includes a seal panel 39, seal lands 40, 41, and a fastener 42 as shown in FIGS. 4 and 5. The seal panel 39 divides axially adjacent compartments 43, 44 within the turbine section 18. The seal lands 40, 41 extend axially aft and away from the seal panel 39. At least one seal land 40, 41 is engaged by the rotatable seal element 32 of the turbine wheel 24. In the illustrative embodiment, both seal lands 40, 41 are engaged with the rotating seal element 32 to seal between the upstream turbine wheel 22 and the downstream turbine wheel 24. The fastener 42 extends away from the seal panel 39 and engages a seal mount 76 of the structural vane 36. The static seal element 38 is fixed to the seal mount 76 by at least one fastener 42. In the illustrative embodiment, the fastener 42 is a bolt/nut combination. In other embodiments, the fastener 42 may be another suitable fastener 42 such as a pin, rivet, or integrated manufacturing retention (casting, welding, etc.). In other embodiments, the fastener 42 may be some other suitable mechanical joint such as a cross-key, a transition fit, or radial birdmouth with engaged rail.

The fastener 42 of the static seal element 38 is not fixed to the composite aero vane 34 in the illustrative embodiment. Each of the plurality of composite aero vanes 34 is spaced apart from the static seal element 38. In the illustrative embodiment, the static seal element 38 is spaced apart from the inner end wall 48 of the composite aero vane 34 to leave a space 45 between the static seal element 38 and the inner end wall 48 of the composite aero vane 34. In other embodiments, a seal may be arranged in the space 45 to seal between the static seal element 38 and the composite aero vane 34 and still allow relative movement of the static seal element 38 relative to the composite aero vane 34.

Figure 6:
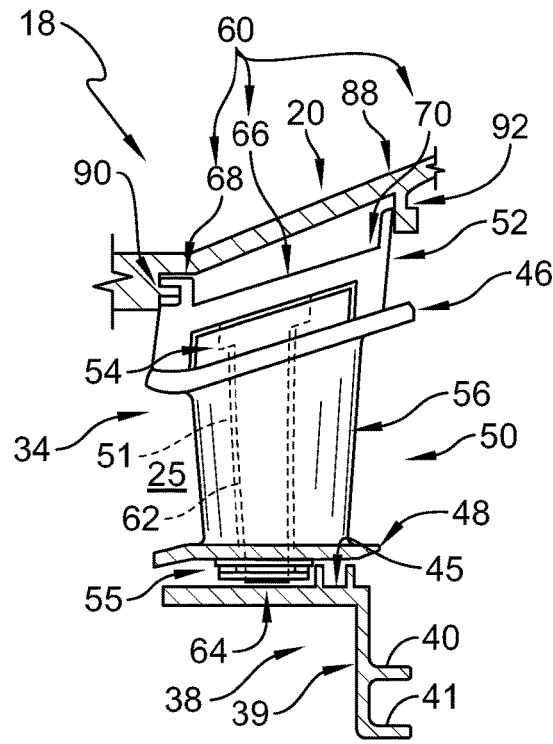
FIG. 6 is detail view of the turbine section similar to FIG. 5 showing that the composite aero vanes are floating relative to the static seal element and that the composite aero vanes are only required to transfer aerodynamic loads acting on the composite aero vanes through a spar to a corresponding turbine case.

Turning again to the plurality of composite aero vanes 34, each of the plurality of composite aero vanes 34 includes an outer end wall 46, an inner end wall 48, an airfoil 50, and a vane mount unit 52 as shown in FIG. 6. The inner end wall 48 is spaced radially inward of the outer end wall 46. The airfoil 50 extends between and interconnects the outer end wall 46 and the inner end wall 48. The airfoil 50 is shaped to redirect air moving along the primary gas path 25 of the turbine section 18 that extends radially from the outer end wall 46 to the inner end wall 48. The airfoil 50 is also shaped to include a vane cavity 51 extending radially through the airfoil 50 and opens at the inner and outer end walls 46, 48. The outer end wall 46 defines a radially outer boundary of the primary gas path 25 and the inner end wall 48 defines a radially inner boundary of the primary gas path 25. The vane mount unit 52 mounts the composite aero vanes 34 to the turbine case 20 without engaging the static seal component 38.

The airfoil 50 includes a radial outer end 54, a radial inner end 55, and a body 56 as shown in FIG. 6. The radial outer end 54 extends radially-outwardly past the outer end wall 46 outside the primary gas path 25 in the illustrative embodiment. The radial inner end 55 is spaced apart from the radial outer end 54 relative to the axis 11 and extends radially-inwardly past the inner end wall 48 outside the primary gas path 25. The radial inner end 55 of the airfoil 50 of the composite aero vane 34 engages the vane mount unit 52. The body 56 extends radially entirely between and interconnects the radial outer end 54 and the radial inner end 55.

The airfoil 50 also includes an outer surface 57 and an interior surface 58 as shown in FIG. 8. The outer surface 57 faces the primary gas path 25 and extends between the inner and outer end walls 46, 48 of the composite aero vane 34. The outer surface 57 has an outer surface area 57 facing the primary gas path 25. The interior surface 58 is spaced apart from the outer surface 57 and faces away from the primary gas path 25 to form the vane cavity 51. The airfoil 50 has a thickness t1 between the outer surface 57 and the interior surface 58. In other embodiments, the airfoil 50 may be completely solid like as shown in FIG. 8A. The airfoil 50 also has a first chord length that extends from a leading edge to a trailing edge of the airfoil 50.

The vane mount unit 52 of the composite aero vanes 34 includes a carrier 60, a spar 62, and a clamp nut 64 as shown in FIG. 6. The spar 62 is made from metallic materials and the metallic spar 62 extends through the vane cavity 51 of the airfoils 50 of the composite aero vanes 34. In some embodiments, the spar 62 may be hollow and include cooling holes to transmit cooling air to the composite aero vane 34 and/or into the inter-disk cavity between the turbine wheels 22, 24. The spar 62 is configured to receive aerodynamic loads from the airfoil 50 of the composite aero vane 34 during use of the turbine section 18 in the gas turbine engine 10. The carrier 60 is made from metallic materials and is coupled to the spar 62. The carrier 60 engages the turbine case 20 to carry aerodynamic loads from the spar 62 to the turbine case 20. The clamp nut 64 is located radially inward of the inner end wall 48 of the composite aero vane 34 and mates with the spar 62 to clamp the composite aero vane 34 blocking radial movement of the composite aero vane 34 relative to the axis 11.

In the illustrative embodiment, the clamp nut radially retains the composite aero vane 34 relative to the spar 62. In other embodiments, other methods to radially retain the composite aero vane 34 may be used, such as a pin, other fastener, or integrated manufacturing retention (casting, welding, etc.). In some embodiments, the spar 62 may couple to the static seal element 38 directly.

The carrier 60 of the vane mount unit 52 includes a body panel 66, a forward mount hanger 68, and an aft mount rail 70 as shown in FIG. 6. The forward hanger 68 extends radially outward from the carrier body panel 66 at a forward end of the body panel 66 and is engaged with a forward bracket 90 of the turbine case 20. The aft mount rail 70 extends radially outward form the carrier body panel 66 at an aft end of the body panel 66 and is engaged with an aft bracket 92 of the turbine case 20. The spar 62 couples to the body panel 66 of the carrier 60 in between the forward and aft attachment features 68, 70.

The spar 62 of the vane mount unit 52 is shaped to engage the airfoil 50 of the composite aero vane 34 at a location radially outward or radially inward of the primary gas path 25. The spar 62 engages the airfoil 50 of the composite aero vane 34 to transfer aerodynamic loads of the airfoil 50 to the spar 62 so that the spar 62 may carry the aerodynamic loads to the turbine case 20.

Each of the structural vanes 36 includes an outer end wall 72, an inner end wall 74, an airfoil 76, a case mount 77, and a seal mount 78 as shown in FIG. 5. The inner end wall 74 faces the primary gas path 25. The outer end wall 72 is spaced radially from the inner end wall 74 and faces the primary gas path 25. The airfoil 76 is formed integrally with the inner end wall 74 and the outer end wall 72 across the primary gas path 25. The case mount 77 extends radially outwardly from the outer end wall 72 away from the primary gas path 25. The case mount 77 engages the case 20 to couple each structural vane 36 of the plurality of structural vanes 36 and static seal element 38 to the case 20. The seal mount 78 extends radially inwardly from the inner end wall 74 away from the primary gas path 25 and the static seal element 38 is fixed to the seal mount 78.

The airfoil 76 of the structural vanes 36 may be formed to include a cooling air passageway 79 as shown in FIGS. 4-5 and 7-7A. The cooling air passageway 79 extends radially through the airfoil 76 of the structural vane 36 and may be configured to receive a spar 83 as shown in FIG. 7A.

The airfoil 76 may further include an outer surface 81 and an interior surface 82 as shown in FIG. 7. The outer surface 81 faces the primary gas path 25 and extends between the inner and outer end walls 72, 74 of the structural vane 36. The outer surface 81 has an outer surface area 81 that faces the primary gas path 25. The interior surface 82 is spaced apart from the outer surface 81 and faces away from the primary gas path 25 to form the cooling air passageway 79.

The airfoil 76 has a thickness t2 between the outer surface 81 and the interior surface 82. The airfoil 76 also has a second chord length that extends between a leading edge and a trailing edge of the airfoil 76.

In the illustrative embodiment, the outer surface area 81 of the structural vane 36 is greater than the outer surface area 57 of the composite aero vane 34. The thickness t2 of the airfoil 76 of the structural vane 36 is greater than the thickness t1 of the airfoil 50 of the composite aero vane 34. In some embodiments, the second chord length of the airfoil 76 is greater than the first chord length of the airfoil 50 in the illustrative embodiment.

The case mount 77 of the structural vanes 36 includes a forward hanger 84 and an aft rail 86 as shown in FIG. 5. The forward hanger 84 extends radially outward from the outer end wall 72 of the structural vane 36 relative to the axis 11. The aft rail 86 is axially spaced apart from the forward hanger 84 and extends radially outward from the outer end wall 72 of the structural vane 36 relative to the axis 11. The forward hanger 84 engages the case 20 at a location forward of the structural vane 36 and the aft rail 86 engages the case 20 at a location aft of the structural vane 36. The forward hanger 84 and the aft rail 86 engage the case 20 to couple the structural vane 36 to the case 20 and transfer axial loads from the static seal element 38, axial and/or circumferential loads from the structural vane 36, and aerodynamic loads from structural vane 36 to the turbine case 20.

In other embodiments, the structural vane 36 may instead include the separate vane mount unit 52 similar to the vane mount unit 52 of the composite aero vane 34. The vane mount unit 52 may mount the structural vane 36 to the turbine case 20 to transfer axial and aerodynamic loads to the turbine case 20 instead of the case mount 77.

Additionally, the structural vane 36 may further include a spar 83 as shown in FIG. 7A. The spar 83 may extend from the vane mount unit 52 radially through the cooling air passageway 79 of the airfoil 76. The spar 83 may be similar to the spar 62 of the composite aero vane 34 in that the spar 83 may be configured to receive aerodynamic loads from the airfoil 76 of the structural vane 36 during use of the turbine section 18 in the gas turbine engine 10. Additionally, the spar 83 may also be coupled to the static seal assembly 38 to transmit axial loading of the static seal element 38 through the spar 83 to the turbine case 20 instead of the seal mount 76.

In the illustrative embodiment of FIG. 7A, the spar 83 is hollow and includes cooling holes 80 to transmit cooling air to the structural vane 36 and/or into the inter-disk cavity between the turbine wheels 22, 24. The cooling holes 80 direct the cooling air and locally increase the cooling effectiveness on the structural vane 36.

In the illustrative embodiment of FIG. 7A, the structural vane 36 has thickness t2 that is the same as the thickness t1 of the airfoil 50. In other embodiments, if the structural vane 36 comprises metallic materials, the thickness t1 may be less than the thickness t1 of the composite aero vane 34.

Turing again to the turbine case 20, the turbine case 20 may include an annular shell 88, a forward bracket 90, and an aft bracket 92 as shown in FIGS. 4-6. The annular shell 88 extends around the axis 11. The forward bracket 90 extends radially inward from the annular shell 88. The aft bracket 92 extends radially inward from the annular shell 88 at a location axially spaced from the forward bracket 90. The forward and aft brackets 90, 92 also extend circumferentially at least partway around the overall circumferential length of the annular shell 88. In the illustrative embodiment, the turbine case 20 only has two brackets 90, 92. In other embodiments, the turbine case 20 may include two or more brackets.

In the illustrative embodiment, the forward bracket 90 provides a forward attachment feature for the case mount 77 of the structural vanes 36 and the vane mount unit 52 of the composite aero vanes 34 with a hook shape, while the aft bracket 92 provides an aft attachment feature for the case mount 77 and the vane mount unit 52 with a rail shape. In other embodiments, the forward and aft brackets 90, 92 may both be hook shaped. In other embodiments, the forward and aft attachment features 90, 92 may have another suitable shape (dovetail interface, T-shape interface, or other suitable interface shape). Additionally, seals may also be arranged between the brackets 90, 92 and the case mount 77 and/or the vane mount unit 52 to seal between the components.

In the illustrative embodiment, the forward and aft attachment features 90, 92 are axisymmetric about the axis 11. The forward and aft attachment features 90, 92 use the same general attachment and load transfer method for both the composite aero and structural vanes 34, 36.

In the illustrative embodiment, the rotatable seal element 32 includes a knife ring 33 as shown in FIG. 4. The knife ring 33 engages the seal lands of the static seal element to form the seal between the static seal element and the rotatable seal element 32.

The present disclosure is related to a turbine section 18 of a gas turbine engine 10 including a small number of nozzle guide vanes 36 to carry structural loads that ceramic matrix composite vanes 34 cannot tolerate. In the illustrative embodiment, the ceramic matrix composite vanes 34 do not carry additional loading. As the ceramic matrix composite material does not need to carry additional loading, the stresses and/or design flexibility of the composite vanes 34 will improve.

The turbine vane assembly 26 may be configured to support other gas turbine engine components, such as an inter-stage seal 38. Accordingly, an application of a metallic support structure is likely to be required to transmit the axial loading applied to the components to the high-pressure turbine casing 20.

The present disclosure relates to a combination of small and large vanes 34, 36, whereby the inter-stage seal load is largely transmitted through the large vanes 36. The large vanes 36 have a larger second moment of area and therefore can tolerate a relatively larger load, such as the support load from the inter-stage seal 38. The small vanes 34 are aerodynamically efficient and may tolerate a small load or no load at all. An optional metallic spar 62 may be installed inside the smaller vanes 34 and in some embodiments, be configured to accommodate a portion of the inter-stage seal loading.

In some embodiments, the small vanes 34 may be manufactured from silicon carbide/silicon carbide ceramic matrix composite materials. The large vanes 36 may be made of ceramic matrix composite materials or an alternative material, such as metallic materials, depending on the strength requirements of the large vanes 36.

The number of large vanes 36 may be minimized as the large vanes 36 are aerodynamically inferior to the smaller vanes 34. However, the number of large vanes 36 may be greater than 1 to introduce an element of redundancy to the inter-stage seal support structure. The large vanes 36 may be circumferentially equally spaced. Achievement of equivalent aerodynamic performance between the two aerofoil styles (e.g. 34, 36) could be a consideration to avoid introducing additional vibration forcing frequencies.

The small and large vanes (e.g. 34. 36) may have improved aerodynamic performance when compared to a uniformly size set of ceramic matrix composite airfoils. The uniform ceramic matrix composite airfoils may have a relatively large maximum thickness to increase and provide a sufficient second moment of area. However, a large airfoil (e.g. 36) may be able to withstand larger mechanical loads so the mixed airfoil size set could have improved aerodynamic freedom i.e. option for reduced thickness and could result in an aerodynamically superior solution when compared to a uniform size ceramic matrix composite vanes.

The stress of the metal spar (e.g. 62) is proportional to the loading (or number of large vanes) divided by the second moment of area of the vane (or the size of the large vane), therefore an optimum aerodynamic solution may be with a given number and size of the large vane (e.g. 36) that just provides an acceptable stress in the spar 62. It may be advantageous to only transmit the flow through the large vanes (e.g. 36).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine section adapted for use in a gas turbine engine, the turbine section comprising
 a case made from metallic materials and shaped to extend around a central reference axis,
 a turbine wheel housed in the case, the turbine wheel including a disk mounted for rotation about the central reference axis relative to the case, a plurality of blades coupled to the disk for rotation with the disk, and a rotatable seal element coupled to the disk for rotation with the disk, and
 a turbine vane assembly fixed to the case and configured to smooth and redirect air moving along a primary gas path of the turbine section ahead of interaction with the turbine wheel, the turbine vane assembly including (i) a plurality of composite aero vanes made from ceramic matrix composite material shaped to provide inner and outer end walls defining the primary gas path as well as airfoils that extend across the primary gas path, (ii) a plurality of structural vanes shaped to provide airfoils that extend across the primary gas path, and (iii) a static seal element that cooperates with the rotatable seal element of the turbine wheel to provide a seal for resisting movement of gasses across the seal when the turbine section is in use within a gas turbine engine,
 wherein the airfoils of the composite aero vanes each have a first outer surface area facing the primary gas path and the airfoils of the structural vanes each have a second outer surface area facing the primary gas path that is greater than the first outer surface area, and wherein the static seal element is fixed to the plurality of structural vanes so as to be in turn coupled to the case while remaining free for relative movement in relation to the composite aero vanes so that the composite aero vanes are substantially free from carrying mechanical loads applied by pressure on the static seal element to the case.

2. The turbine section of claim 1, wherein the seal provided by the rotatable seal element and the static seal element are arranged radially inward of the primary gas path.

3. The turbine section of claim 2, wherein the static seal element includes a seal panel that divides axially adjacent compartments within the turbine section and at least one seal land that is engaged by the rotatable seal element.

4. The turbine section of claim 3, wherein the rotatable seal element includes a knife ring that engages the land of the static seal element.

5. The turbine section of claim 1, wherein the plurality of structural vanes each include an inner end wall facing the primary gas path, an outer end wall spaced radially from the inner end wall and facing the primary gas path, and the airfoil is formed integrally with the inner end wall and the outer end wall.

6. The turbine section of claim 5, wherein the plurality of structural vanes are made of ceramic matrix composite materials.

7. The turbine section of claim 5, wherein the plurality of structural vanes are made of metallic materials.

8. The turbine section of claim 7, wherein the plurality of structural vanes each include a seal mount that extends radially inwardly from the inner end wall away from the primary gas path and the static seal element is fixed to the seal mount.

9. The turbine section of claim 8, wherein the plurality of structural vanes each include a case mount that extends radially outwardly from the outer end wall away from the primary gas path and the case mount engages the case to couple the structural vane and the static seal element to the case.

10. The turbine section of claim 6, wherein each of the plurality of composite aero vanes is spaced apart from the static seal element.

11. A turbine vane assembly adapted for use in a gas turbine engine, the assembly comprising a plurality of composite aero vanes made from ceramic matrix composite material, each of the plurality of composite aero vanes including an inner end wall that extends partway around a central reference axis, an outer end wall spaced radially from the inner end wall to define a primary gas path therebetween, and an airfoil that extends from the inner end wall to the outer end wall across the primary gas path, a plurality of structural vanes, each of the plurality of structural vanes including airfoils that extend across the primary gas path, and a static seal element fixed to the plurality of structural vanes and spaced apart from the composite aero vanes, wherein the airfoils of the composite aero vanes each have a first outer surface area facing the primary gas path and the airfoils of the structural vanes each have a second outer surface area facing the primary gas path that is greater than the first outer surface area.

12. The assembly of claim 11, wherein the plurality of structural vanes are made of ceramic matrix composite materials.

13. The assembly of claim 11, wherein the plurality of structural vanes are made of metallic materials.

14. The assembly of claim 13, wherein the plurality of structural vanes each include a seal mount that extends radially inwardly from the inner end wall away from the primary gas path and the static seal element is fixed to the seal mount.

15. The assembly of claim 14, wherein the plurality of structural vanes each include a case mount that extends radially outwardly from the outer end wall away from the primary gas path, and the case mount is configured to engage a case so that the static seal element may be fixed to the case via the plurality of structural vanes.

16. The assembly of claim 11, wherein the plurality of structural vanes each further include an inner end wall facing the primary gas path and an outer end wall spaced radially from the inner end wall and facing the primary gas path, and the airfoil is integrally formed with the inner end wall and the outer end wall.

17. The assembly of claim 16, wherein the plurality of structural vanes are made of ceramic matrix composite materials.

18. The assembly of claim 16, wherein the plurality of structural vanes are made of metallic materials.

19. The assembly of claim 11, wherein each of the plurality of composite aero vanes is spaced apart from the static seal element.

20. The assembly of claim 19, wherein the plurality of composite aero vanes are each mounted to a metallic spar that extends radially through the associated airfoil.

* * * * *